Aug. 24, 1965  F. P. SHARPE ETAL  3,202,027
EDGE SHEARING MACHINE WITH MAGNETIC HOLDING MEANS
Filed April 30, 1962  4 Sheets-Sheet 1
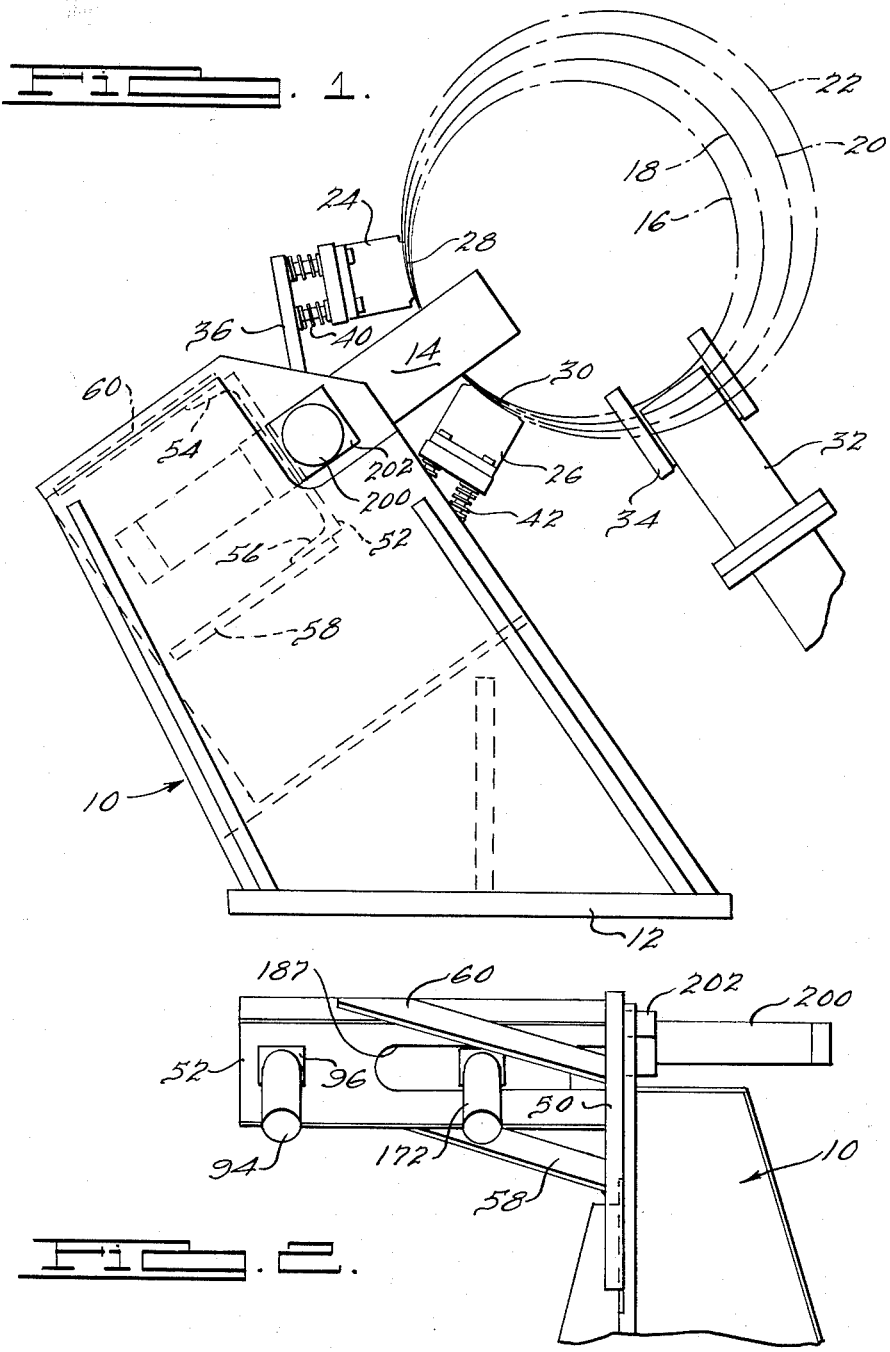
INVENTORS.
Frederick P. Sharpe
George E. Gottwitzer
BY
Harness, Dickey & Pierce
ATTORNEYS.

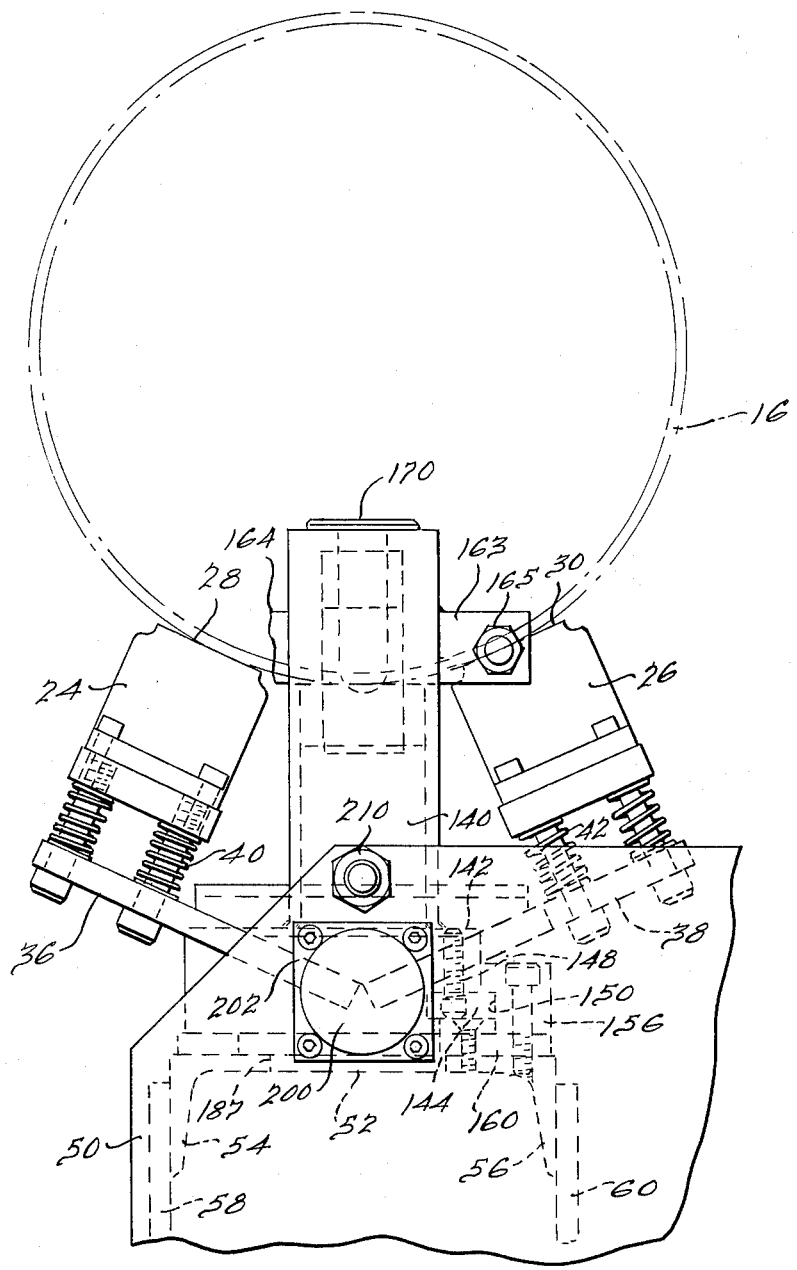

Aug. 24, 1965    F. P. SHARPE ETAL    3,202,027
EDGE SHEARING MACHINE WITH MAGNETIC HOLDING MEANS
Filed April 30, 1962    4 Sheets-Sheet 3
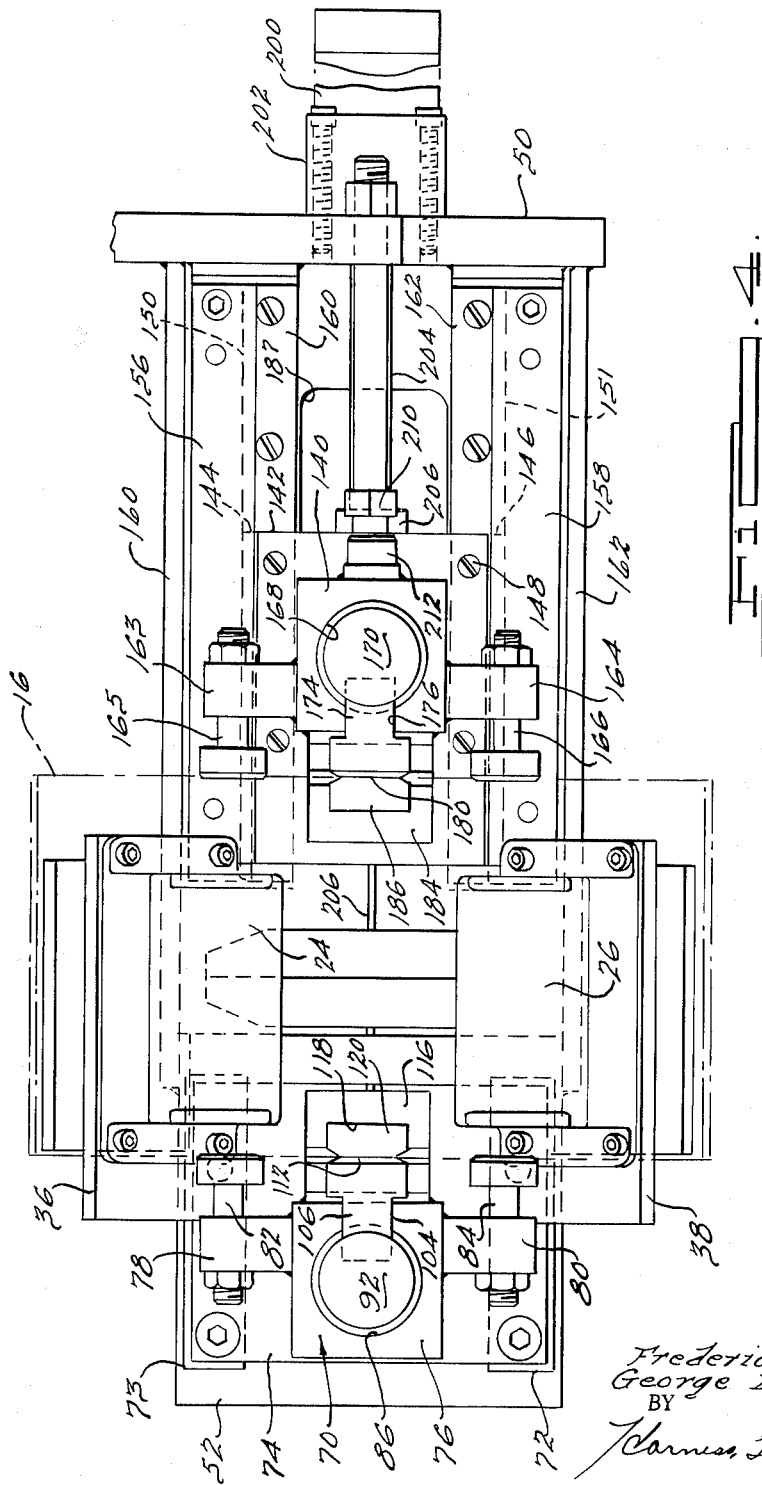
INVENTORS.
Frederick P. Sharpe
George E. Gottwitzer
BY
Harness, Dickey & Pierce
ATTORNEYS.

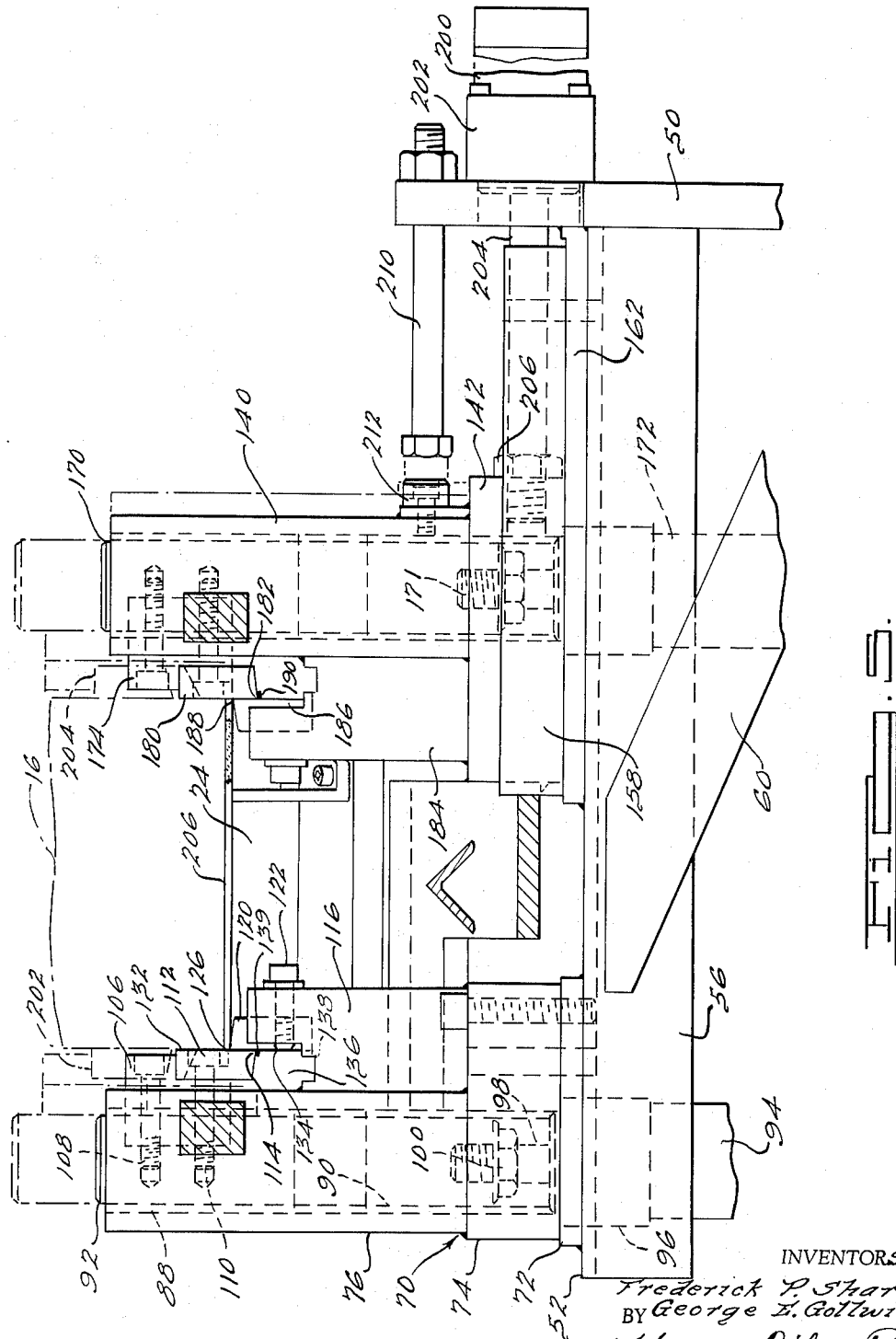

3,202,027
EDGE SHEARING MACHINE WITH MAGNETIC HOLDING MEANS
Frederick P. Sharpe, Dearborn, and George E. Gollwitzer, Belleville, Mich., assignors to Kelsey-Hayes Company, Romulus, Mich., a corporation of Delaware
Filed Apr. 30, 1962, Ser. No. 191,217
9 Claims. (Cl. 83—206)

This invention relates to apparatus for shearing the edge of a welded joint, and more particularly to apparatus for positioning and locating an article for removal of burrs at the edge of a weld and for finishing a side surface of an article extending transversely to the length of the weld.

In butt welding operations where edges of an article are joined together, burrs in the form of uneven and roughened surfaces are formed along the length of the weld seam during the operation. In addition, the ends of the weld extend beyond the side surfaces of the article. In the past, apparatus has been provided for finishing the weld along its longitudinal length. The present apparatus is particularly directed to automatic mechanism for finishing the side edges of a welded article transversely to the length of the weld.

The present invention is specifically adapted for use in the manufacture of vehicle wheels wherein a strip of sheet material is roll-formed into an annular band. Opposite ends of the annular band are welded to form a continuous cylindrical band. The welding operation produces uneven and roughened surfaces on both sides of the weld joint and at the edges of the band. Automatic machinery is conventionally provided to smooth and finish the roughened surfaces along the top and bottom of the weld joint. After the top and bottom surfaces have been smoothed and finished, the vehicle wheel band is delivered to the present apparatus to finish and smooth the side edges of the band adjacent the weld. The welded band is delivered to the edge shearing apparatus in a predetermined position and received by electromagnetic means to maintain the apparatus in the predetermined position. Jaw means are provided to grip the apparatus in the machine and blade means are provided to pass over the side edges of the band and shear off the excess material formed during the welding operation. The jaw means and the blade means are integrated in a manner providing adaptability for bands of varying sizes.

It is therefore an object of the present invention to provide apparatus for automatically trimming and finishing the side edges of a weld joint.

Another object of the present invention is to provide means for trimming and finishing a weld joint area which are adaptable for use with a variety of articles of different dimensional characteristics.

Still another object is to provide automatic mechanism for dressing a weld joint of an article in a precise manner requiring no manual positioning or location of the article in the mechanism.

Still a further object of the present invention is to provide apparatus for holding an article for a finishing operation in a manner insuring accurate location of the article relative to finishing tools associated with the apparatus and simultaneously permitting adjusting movement of the article.

Other objects and advantages of the present invention will become apparent by reference to the following detailed description and the accompanying drawing wherein:

FIGURE 1 is a side elevational view of apparatus embodying the principles of the present invention;

FIGURE 2 is an end view of the apparatus shown in FIG. 1;

FIGURE 3 is an enlarged side elevational view of a portion of the apparatus shown in FIG. 1;

FIGURE 4 is a plan view of the apparatus shown in FIG. 3; and

FIGURE 5 is a side elevational view of the apparatus shown in FIG. 4.

Referring now to FIG. 1, the apparatus of the present invention is shown to be mounted on an inclined support frame 10 which is fixedly secured to a suitable base portion 12. An edge shearing unit 14 is mounted on the frame 10 and extends transversely thereto. The machine is adapted to operate on annular bands 16, 18, 20, 22 of varying diameters and widths manufactured by roll-forming sheet metal blanks and welding opposite ends of the blanks in annular form. The edge shearing unit includes a band seat formed by electromagnets 24, 26 having elongated abutment surfaces 28, 30 which are inclined to extend substantially tangentially to the area defined by the annular bands at the point of contact with the outer surface thereof. The annular welded bands are delivered one at a time onto the seat provided by the electromagnets by a transfer arm 32 having jaw means 34 for gripping the annular bands in a manner described in copending application Serial No. 119,487, now abandoned. The transfer arm 32 is adapted to transfer welded bands from a welding operation or other work station to the position shown in FIG. 1. The electromagnets are resiliently mounted on support brackets 36, 38 by cushion springs 40, 42.

Referring now to FIGS. 4 and 5, the edge shearing unit comprises a frame formed from a base plate 50 which is suitably secured to the frame 10 and a channel-shaped support 52 having parallel side plates 54, 56 which are connected by braces 58, 60 to the base plate. Jaw means are mounted on the channel member 52 and comprise a backup pillar 70 formed at one end by base plates 72, 73, an intermediate support block 74 and a pillar 76. The pillar 76 is provided with transversely extending wings 78, 80 on which adjustable stop elements 82, 84 are mounted. The pillar 76 is further provided with a central bore 86 within which a pair of bearing sleeves 88, 90 are provided. The bearing sleeves slidably receive a shaft element 92 which is reciprocable therein by means of an air cylinder or the like 94. A collar 96 secures the air cylinder to the channel member 52 in a transversely extending position relative thereto. A piston rod 98 is connected by suitable means 100 to the end of the shaft 92 to impart reciprocatory movement thereto.

The upper inner end of the support pillar 76 is slotted at 104 to provide a substantially rectangular guideway. A T-shaped guide block 106 is secured to the upper end of the shaft 92 by suitable bolt means 108, 110 and is slidably received within the slot 104. A blade 112 having a cutting edge 114 is secured to the blade block 106 by the bolt means 110 in a conventional manner. A lower blade block 116 is suitably fastened to the intermediate support block 74 and is provided at its upper end with a blade receiving slot 118. A blade 120 is suitably secured in the slot 118 by the fastening means 122. A cutting edge 126 is provided on the upper edge of the blade 120 and coacts with the cutting edge 114 during reciprocation thereof. The adjacent surfaces 132, 134 of the blades are aligned and have a sliding relationship relative to one another during movement of the upper blade 112. The blade block 120 defines a slot 136 with the pillar 76 in which the upper blade 112 is receivable. A chute 138 may be provided at the bottom of the slot portion of the blade blocks to facilitate removal of weld chips 139.

The other portion of the jaw means comprises a movable pillar 140 which is substantially identical to the pillar 76 and a pillar plate 142. Slide means for plate 142 are provided by slide plates 144, 146 which are suitably secured to the plate 142 by bolts 148 or the like. The slide plates 144, 146 are slidably received within guideways 150, 151 defined by guide blocks 156, 158, 160, 162. The pillar 140 is provided with wing portions 163, 164 on which adjustable stops 165, 166 are mounted. A central bore 168 is provided in the pillar 140 and slidably receives a shaft 170 which is connected at its lower end to the piston rod 171 of an air cyclinder 172. A blade block 174 is connected to the upper end of the shaft 170 and is slidably received within a slot 176 formed in the side wall of the pillar. A blade 180 is fixed to the blade block 174 and is provided with a cutting edge 182. A lower blade block 184 is fixedly mounted on the plate 142 and supports a blade 186 having a cutting edge 188 which is cooperable with the blade 180 to shear excess weld 190 from the side surface of the annular band 16. It will be seen that the pillar 140, blade blocks 174, 184, and blades 180, 186 are movable as a unit with the plate 142. Similarly, the air cylinder 172 and shaft 170 are also movable with the slide means by the provision of a slot 187 in the channel member 52. In order to actuate the slide means between extended and retracted positions, an air cylinder 200 having a mounting plate 202 is securely fastened to the plate 50 and has a piston rod 204 secured to the slide plate 142 by suitable connecting means 206. Adjustable stop means 210, 212 are provided to form a limit for retraction of the slide means.

In operation, a welded band 16 is delivered onto the upper surfaces of the electromagnets 24, 26 by the transfer arm 32. As the band is brought into position against the outer surfaces 28, 30 of the electromagnets, the electromagnets are energized by conventional circuitry to secure the band in place. The transfer arm is released from the band and returned to its original position. The band then remains seated and magnetically held on the electromagnets. The band is centrally placed between the jaw portions and is therefore, in the initial position, randomly located between the side surfaces of the upper blade members 112, 180. The stops, 82, 84 and 165, 166 have previously been adjusted to accommodate a band having a particular width. The adjacent side surfaces of each pair of the cutting blades have been adjusted to have sliding surface engagement with one another. The upper blades 112, 180 are in an extended position spaced vertically above the lower blades 120, 186 as shown in phantom at 202, 204.

When the band is placed on the electromagnets, the weld seam 206 is located substantially equidistance between the electromagnets by the arm 32 as shown in FIG. 4. The cylinder 200 is actuated by conventional circuitry to extend the piston rod 204 and move the slide means toward the fixed jaw assembly 70. As the slide means moves forwardly, the band 16 is slidably displaced across the outer surfaces of the electromagnets by abutting engagement with the stops 165, 166. The band displacement continues until the opposite edge of the band 20 comes into abutting engagement with the stops 82, 84. At this time, the cylinders 94 and 172 are simultaneously actuated to retract the shafts 92 and 170. Downward movement of the shafts 92 and 170 displaces the upper cutting blades 112, 180 downwardly from the upper extended positions above the lower cutting blades 120, 186. The portions 139, 190 of the weld which extend beyond the side surfaces of the band are sheared away by coaction of the cutting edges 114, 126, and 182, 188. After the weld projections have been sheared off, the air cylinders 94, 172 are again actuated to extend the blades by movement of the shafts 92, 170. The cylinder 200 is thereafter actuated to return the slide means to the original position and the electromagnets 24 and 26 are deenergized to release the band 16 onto an adjacent chute or other suitable conveyor. The operation may be controlled in any conventional manner by suitable limit switches and circuitry which is well known to ordinary mechanics and is, therefore, not described in detail herein.

The spring means 40, 42 which resiliently support the electromagnet members permit high force engagement between the band and the electromagnets and fast movement of the transfer arm without damage to the electromagnets. The jaw means are designed for combination with the shearing means in a manner providing an extremely simple and compact fixture for locating, holding and shearing the side surfaces of a weld joint. The apparatus provides sufficient support for the band to permit the shearing operation to take place and locates the weld joint accurately relative to the shearing blades. The arrangement causes surprisingly little twisting or deformation of the band during the shearing operation since all of the forces are exerted through surface areas of the band which are directly supported adjacent the shear area. Furthermore, the spring means on the backups permits some of the shear shock to be absorbed without damage to the parts. Since both sides of the bands are sheared simultaneously, equal and opposite forces are imparted thereto which facilitate the shearing operation.

Although a particular arrangement has been disclosed for illustrative purposes, it will be recognized by those skilled in the art that the principles of the present invention are susceptible of utilization in various modifications and rearrangements of the apparatus. Accordingly, it is intended that the scope of the subject invention, as defined by the appended claims, include alternative embodiments wherein the inventive principles disclosed herein are utilized.

The invention claimed is:

1. Apparatus for shearing a portion of a weld joint on the side surface of an article and comprising: magnetic means for receiving and holding said article, jaw means movable to an open position to permit placement of said article on said magnetic means and a closed position to cause sliding movement of said article relative to said magnetic means to a predetermined position, shearing means operable upon said weld joint in said predetermined position, and said shear means being mounted on said jaw means for movement therewith between said open and said closed positions, said shear means being operable in said closed position to shear said weld joint on said article.

2. Apparatus for shearing the side surfaces of a weld joint comprising: support means for said apparatus, electromagnetic means mounted on said support means, abutment surfaces provided on said electromagnetic means to receive and hold an article, spring means resiliently mounting said electromagnetic means, transfer means to locate an article on said abutment surfaces, spaced jaw means located on opposite sides of said electromagnetic means, slide means associated with said jaw means to vary the spacing thereof, article engaging surfaces provided on said jaw means to engage said article and cause movement thereof along said abutment surfaces to a predetermined position, and shearing means associated with said jaw means and being operable at said predetermined position to shear the side surfaces of a weld joint on said article.

3. The apparatus as defined in claim 2 and wherein said shearing means comprises for each side surface to be sheared, a fixed blade located adjacent said side surface, a movable blade spaced from said fixed blade beyond said side surface in alignment with said fixed blade to produce a shearing action, and power operable means to move said movable blade by said fixed blade and shear said side surface.

4. The apparatus as defined in claim 3 and wherein said power means and said fixed blade and said movable blade are mounted on said jaw means and variably positionable therewith.

5. Apparatus for shearing opposite side surfaces of a weld joint comprising support means for said apparatus, magnetic means mounted on said support means and having spaced abutment surfaces to receive and slidably hold an article, spaced jaw means located on opposite sides of said abutment surfaces, slide means associated with said jaw means to vary the spacing thereof, article engaging surfaces provided on said jaw means to engage said article and cause sliding movement thereof along said abutment surfaces to a predetermined position, and shearing means mounted on said jaw means and being operable at said predetermined position to shear the opposite side surfaces of a weld joint on said article.

6. A device for shearing the ends of a weld seam of a cylindrical wheel band or the like comprising magnetic means for slidably holding said band with said weld seam in a predetermined position, first and second shear means mounted on opposite sides of said magnetic means, first and second jaw means mounted on opposite sides of said magnetic means and being relatively movable from an open spaced position whereat said band may be received by said magnetic means to a closed gripping position holding said band in position for a shearing operation on the opposite ends of said weld seam by said shear means, and power operable shear actuating means operable in the closed gripping position of said jaw means to actuate said shear means and simultaneously shear the ends of said weld seam.

7. A device for shearing the ends of a weld seam of a cylindrical band or the like comprising a pair of reciprocably mounted shear means, a pair of fixed shear means associated with said reciprocably mounted shear means, a pair of magnetic band holding means spaced on opposite sides of a longitudinal line extending between said fixed shear means, and adapted to receive and slidably hold said band with said weld seam extending along said longitudinal line between and in alignment with said fixed shear means, a pair of jaw means relatively movable axially in a path parallel to said longitudinal line between an open position permitting placement of said band on said magnetic band holding means and a closed position locating the ends of the weld seam of said band between said fixed shear means and said reciprocably mounted shear means by sliding movement of said band relative to said magnetic band holding means, and power operable actuating means operable in the closed position of said jaw means to actuate said shear means and simultaneously shear the opposite ends of said weld seam.

8. The invention as defined in claim 7 and said shear means being mounted on and movable with said jaw means.

9. The invention as defined in claim 7 and having spring means normally supporting said band on said magnetic band holding means in spaced relationship to said fixed shear means and permitting displacement of said band under load.

References Cited by the Examiner

UNITED STATES PATENTS

| | | | |
|---|---|---|---|
| 2,165,614 | 7/39 | Cook | 83—206 |
| 2,660,969 | 12/53 | Woolford | 198—41 |
| 2,731,137 | 1/56 | Socke | 198—41 |
| 2,854,743 | 10/58 | Gollwitzer | 83—914 |

FOREIGN PATENTS 871,529    4/42    France.

ANDREW R. JUHASZ, *Primary Examiner.*